Patented July 10, 1951

2,559,612

UNITED STATES PATENT OFFICE 2,559,612

METHOD OF STABILIZING THE FOAM OF MALT BEVERAGES

Harold H. Geller, Milwaukee, Wis.

No Drawing. Application November 5, 1949, Serial No. 125,841

4 Claims. (Cl. 99—48)

This invention relates to foam stabilizing compositions and more particularly to compositions for the stabilization of foams caused by solutions of hydrolyzed proteins, naturally occurring gums, soaps, malt beverages and native proteins.

One of the objects of the invention is to produce new and useful compositions of matter which are especially suited for the stabilization of foams of the types previously described.

A further object is to provide new and improved compositions of matter for stabilizing foams in liquids containing dispersed or dissolved proteins.

A still further object of the invention is to provide new and improved compositions of matter for stabilizing foams in carbon dioxide containing beverages.

Still another object of the invention is to provide new and improved compositions of matter especially useful for the stabilizing of beer foam. Other objects will appear hereinafter.

In accordance with the invention new and improved compositions of matter are prepared by treating an alkylene glycol alginate with an organic solvent and recovering the residue remaining after the extraction of the alkylene glycol alginate with the organic solvent.

The term "alkylene glycol alginate" is used herein to refer to the reaction product of an alkylene oxide with alginic acid, the oxide being believed to react mainly with the carboxyl groups of the acid but not excluding the possibility of some reaction with the hydroxyl groups thereof. Typical of such compositions are those disclosed and defined in U. S. Patent 2,426,125. The propylene glycol alginate is a product obtained by reacting 1,2-propylene oxide with alginic acid.

When alkylene glycol alginates, typical of which are those produced as described in U. S. Patent 2,426,125, are employed in the stabilization of foams, the results obtained are erratic apparently due to the presence of a by-product inhibiting material that inhibits or destroys the stabilizing function of the alkylene glycol alginate and if present in sufficiently large amounts acts as an inhibitor of foam formation. In the practice of the present invention it has been found that extraction of the alkylene glycol alginates with an organic solvent will remove this inhibiting material, and the residual alkylene glycol alginate has an exceptionally high foam stabilizing capacity. If the extracted material in the form of a solution is again added to a liquid capable of producing foam, the foam stability is lost or greatly reduced. It appears that this material which is present in the alginate in small amounts (less than 1%) is the result of side reactions of the alkylene oxide or glycol with the alginic acid and that the extent to which these side reactions will occur will depend upon the temperature, concentration of the reacting materials and other conditions of the reaction.

Regardless of the amount of the inhibiting substance present in the alkylene oxide-alginic acid reaction product, it has been found that it may be removed by extraction with an organic solvent. The most practical solvent to employ is ethyl alcohol but other homologous alcohols may be used and other solvents may be employed which are substantially non-solvents for the alkylene glycol alginate.

The alcoholic extraction of the aforementioned glycol esters, in all cases, resulted in a material which possessed the property of greatly enhancing the stability of various foams. In those cases where the initial non-alcohol extracted product was not a satisfactory foam stabilizer, it was found that this property of the material could be markedly improved by the extraction. In those cases where the non-alcohol extracted material contributed fair stability, the foam stability was further improved by the extraction. Consequently, for the purpose of foam stabilization, the present invention greatly improves upon the glycol esters previously described. As an example, one particular sample (unextracted) had practically no effect on the foam stability of beer when used in 0.011% concentration. After alcoholic extraction the material improved the foam stability and in terms of sigma raised it from 134 units to 167 units when added in 0.011% concentration.

In the process of manufacture of propylene glycol alginates, an alkaline agent may be added at the end of the reaction to neutralize any non-reacting acid left. This is done by using an aqueous alkali solution such as an aqueous solution of sodium carbonate, ammonia, etc. Instead of using alcohol for extracting inhibiting material as a separate step, substantially the same objective can be obtained by conducting this neutralization with an alcoholic alkali solution instead of an aqueous alkali solution. The alcohol present, which is later removed, extracts the foam inhibiting substance formed during the reaction.

The method used for the determination of foam stability is known as the sigma method. It is a modification of the one described in the Proceedings of the American Society of Brewing Chemists for 1940. In this method a stream of carbon dioxide is passed through a porous cylinder into the solution until a given amount of foam is formed. The amount of liquid remaining in the foam after a given time is measured and the sigma calculated by a formula given in the above publication. Differences of less than 6 sigma units are not significant due to the sensitivity of the method and to the errors inherent to it. In actual practice it is difficult to observe an improvement in foam stability unless the increase in sigma units is greater than about 10. While 0.011% of alginate was used for testing purposes, the actual amount to be used in beer packaged for commercial production should preferably be less. The amounts of glycol alginate used tend to affect the shelf life of the beer, with larger amounts giving poorer shelf life.

The invention will be illustrated but is not limited by the following examples in which the quantities are stated in percentage by weight unless otherwise indicated.

Example I

The propylene glycol alginate used in this example was Kelcoloid obtained from the Kelco Company. It is presumably made as described in U. S. Patent 2,426,125. This particular sample was not a good foam stabilizer. When added to polished beer in a concentration of 0.011%, it raised the sigma of the beer from 130 to only 139. This propylene glycol alginate was then extracted with alcohol by suspending 20 parts by weight of the material in 190 parts by weight of ethyl alcohol. The suspension was stirred for one hour at room temperature (75 degrees F.), filtered and air dried. When the alcohol extracted material was added to finished beer in a concentration of 0.011% the sigma was increased from 130 to 166.

Example II

A propylene glycol alginate prepared by the Kelco Company presumably as described in Example I of U. S. Patent 2,426,125 and sold under the trade name of Kelcoloid, was extracted with alcohol by suspending 20 parts by weight of the resultant propylene glycol alginate in 190 parts by weight of ethyl alcohol. The suspension was stirred for one hour at room temperature (75 degrees F.), filtered and air dried. When this material was added to finished beer in a concentration of 0.011% the sigma was increased from 135 to 183. The same material before alcoholic extraction raised the sigma of the same beer from 135 to 157 when used in the same concentration.

Example III

A sample of propylene glycol alginate, of the same type as described above, was added to polished beer in a concentration of 0.011%. It raised the sigma of the beer from 130 to only 139. The propylene glycol alginate was then extracted with ethyl alcohol, as described in Example I. When the alcohol extracted material was added to the finished beer in a concentration of 0.011% the sigma was increased from 130 to 166.

A small amount of the inhibiting impurity was then isolated from the alcohol used in the extraction of propylene glycol alginate. This inhibiting impurity is a white solid of high molecular weight. A dilute solution of the inhibiting impurity was then prepared.

When a small amount of this dilute solution of the inhibiting impurity (0.00005% by weight of the beer) was added to the beer containing the alcohol treated alginate the sigma was reduced from 166 to 135.

The extracted impurity when added as a solution to beer in a concentration of 0.00005% lowered the foam stability from 130 sigma units to 105.

Example IV

A sample of propylene glycol alginate (Kelcoloid) was added to beer in a concentration of 0.0055% 72 hours before the final filtration. This beer, after filtering, had a sigma value of 167. The same beer without the propylene glycol alginate had a sigma value of 140.

The above sample of propylene glycol alginate was then extracted with alcohol as described in Example I and added to the same beer in the same proportion as described above. The finished beer now had a sigma value of 180.

Example V

Twenty grams of propylene glycol alginate obtained from the Kelco Company as Kelcoloid was mixed with 200 cc. of methyl alcohol and stirred at room temperature for one hour. The mixture was filtered and air dried. The extracted material was added to finished beer in a concentration of 0.011%. The control beer had a sigma value of 142, while the same beer containing 0.011% of methyl alcohol extracted material had a sigma value of 178.

A sample of the control beer containing 0.011% of the regular propylene glycol alginate had a sigma value of 160.

Example VI

Twenty grams of propylene glycol alginate obtained from the Kelco Company as Kelcoloid and presumably prepared as described in Example I of U. S. Patent 2,422,125 was mixed with 200 cc. of acetone and stirred at room temperature for one hour. The mixture was filtered and air dried. The extracted material was added to finished beer in a concentration of 0.011%. The control beer had a sigma value of 142, while the same beer containing 0.011% of acetone extracted material had a sigma value of 175.

A sample of the control beer containing 0.011% of the unextracted propylene glycol alginate had a sigma value of 160.

Example VII

The foam inhibiting impurity present in the propylene glycol alginate could also be extracted with a water immiscible solvent such as benzene. The efficiency of any extraction is dependent upon the amount of impurity present in the material.

A certain sample of propylene glycol alginate was found to have very little effect on the foaming property of beer. This sample, when added to finished beer in a concentration of 0.01% raised the sigma value by less than 10 units.

The same sample of propylene glycol alginate was then extracted with benzene for one hour and air dried. The dry extracted material was then added to finished beer in a concentration of 0.01% and the sigma value of the beer was increased from 130 to 151.

When the same sample was extracted with alcohol the sigma was raised to 166.

Example VIII

The procedure in Example II was repeated except that the suspension was heated under reflux for 15 minutes instead of being stirred for one hour at room temperature. The unextracted material when used in 0.011% concentration raised the sigma of finished beer from 135 to 157, while the product extracted as described above raised the sigma from 135 to 183 when used in the same concentration.

*Example IX*

Five hundred (500) grams of propylene glycol alginate was mixed with 1500 cc. of ethyl alcohol and stirred at room temperature for 2 hours. The material was filtered and air dried. The unextracted material when added to polished beer in 0.011% concentration raised the sigma from 137 to 161, while the alcohol extracted material when added to the same beer in 0.011% concentration raised the sigma from 137 to 182.

The quantities of the compositions of the present invention which are required for the stabilization of foams are very small. In most instances, an amount within the range of 25 parts to 500 parts of the foam stabilizing composition per million parts of the foam forming liquid will be satisfactory to enhance the foam stability. It is desirable to use as small amounts as possible, preferably less than 110 parts per million, not only from the point of view of cost but also to avoid reduction in the shelf life of the finished beer.

The extracted propylene glycol alginate may be added at any convenient point during the manufacture of the beer but preferably after the first filtration and prior to the final filtration.

The preferred solvents employed for the purpose of the invention are water miscible organic solvents which are inert to the alkylene glycol alginate, e. g., water miscible alcohols and ketones. However, as illustrated by the examples, water immiscible inert organic solvents, including the aromatic liquid hydrocarbons, e. g., benzene, toluene and the xylenes, or mixtures of any of such solvents, may also be employed.

It will be understood that some variations and modifications may be made in the procedures and proportions described without departing from the invention. For the purpose of the invention the products resulting from the reaction of the alkylene oxide with the alginic acid may be neutralized with an alkaline solution, preferably an alcoholic alkaline solution to a pH between 3 and 6. The alkalinity may be supplied by the ordinary alkali or alkaline salt, such as sodium carbonate, potassium carbonate, and alkaline sodium or ammonium orthophosphates.

The term "alkylene" as employed herein refers to ethylene, propylene, 1,2-propylene, and their homologues.

The invention is hereby claimed as follows:

1. The method of stabilizing the foam of normally foam forming malt beverages, which comprises removing by extraction with an organic solvent from the substantially neutralized product of the reaction of 1,2-propylene oxide and alginic acid the by-products which adversely affect foam stability in malt beverages, and then adding the resulting product to the beverage.

2. The method of stabilizing the foam of normally foam forming malt beverages, which comprises removing by extraction with ethyl alcohol the substantially neutralized product of the reaction of 1,2-propylene oxide and alginic acid the by-products which adversely affect foam stability in malt beverages, and then adding the resulting product to the beverage.

3. The method of stabilizing the foam of normally foam forming malt beverages, which comprises adding to the beverage the substantially neutralized product of the reaction of 1,2-propylene oxide and alginic acid from which by-products adversely affecting foam stability in malt beverages have been removed by extraction with an organic solvent.

4. The method of stabilizing the foam of normally foam forming malt beverages, which comprises adding to the beverage the substantially neutralized product of 1,2-propylene oxide and alginic acid from which by-products adversely affecting foam stability in malt beverages have been removed by extraction with ethyl alcohol.

HAROLD H. GELLER.

REFERENCES CITED

The following references are of record in the file of this patent:

UNITED STATES PATENTS

| Number | Name | Date |
|---|---|---|
| 2,478,988 | Wallerstein et al. | Aug. 18, 1949 |
| 2,494,912 | Steiner et al. | Jan. 17, 1950 |

Certificate of Correction

Patent No. 2,559,612                                        July 10, 1951

HAROLD H. GELLER

It is hereby certified that error appears in the printed specification of the above numbered patent requiring correction as follows:

Column 4, line 39, for "U. S. Patent 2,422,125" read *U. S. Patent 2,426,125*;

and that the said Letters Patent should be read as corrected above, so that the same may conform to the record of the case in the Patent Office.

Signed and sealed this 23rd day of October, A. D. 1951.

[SEAL]

THOMAS F. MURPHY,
*Assistant Commissioner of Patents.*